United States Patent
Doumuki et al.

(10) Patent No.: US 7,616,762 B2
(45) Date of Patent: Nov. 10, 2009

(54) SYSTEM AND METHOD FOR AUTHENTICATING/REGISTERING NETWORK DEVICE IN POWER LINE COMMUNICATION (PLC)

(75) Inventors: Tohru Doumuki, San Diego, CA (US); Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 873 days.

(21) Appl. No.: 11/045,734

(22) Filed: Jan. 28, 2005

(65) Prior Publication Data

US 2006/0038660 A1 Feb. 23, 2006

Related U.S. Application Data

(60) Provisional application No. 60/603,483, filed on Aug. 20, 2004, provisional application No. 60/637,049, filed on Dec. 16, 2004.

(51) Int. Cl.
*G05B 11/01* (2006.01)

(52) U.S. Cl. .............. 380/42; 713/171; 713/159; 370/445; 370/464; 709/203; 709/238

(58) Field of Classification Search ............ 380/42
See application file for complete search history.

(56) References Cited

U.S. PATENT DOCUMENTS

| | | | |
|---|---|---|---|
| 5,546,463 A | 8/1996 | Caputo et al. | |
| 5,818,821 A | 10/1998 | Schurig | |
| 5,878,142 A * | 3/1999 | Caputo et al. | 713/159 |
| 6,885,674 B2 * | 4/2005 | Hunt et al. | 370/420 |
| 7,257,644 B2 * | 8/2007 | Simonnet et al. | 709/238 |
| 7,340,612 B1 * | 3/2008 | Durand et al. | 713/182 |
| 2002/0176583 A1 | 11/2002 | Buttiker | |
| 2003/0079000 A1 | 4/2003 | Chamberlain | |
| 2003/0103521 A1 * | 6/2003 | Raphaeli et al. | 370/445 |
| 2003/0224784 A1 | 12/2003 | Hunt et al. | |
| 2004/0113757 A1 * | 6/2004 | White et al. | 340/310.01 |
| 2004/0131189 A1 | 7/2004 | Lawton et al. | |
| 2004/0135676 A1 * | 7/2004 | Berkman et al. | 340/310.01 |
| 2004/0153171 A1 | 8/2004 | Brandt et al. | |
| 2004/0161107 A1 | 8/2004 | Oyama | |
| 2004/0177167 A1 | 9/2004 | Iwamura et al. | |
| 2004/0184406 A1 | 9/2004 | Iwamura | |
| 2004/0210630 A1 * | 10/2004 | Simonnet et al. | 709/203 |
| 2004/0223617 A1 | 11/2004 | Corcoran et al. | |
| 2007/0079123 A1 * | 4/2007 | Iwamura | 713/171 |

* cited by examiner

*Primary Examiner*—Kambiz Zand
*Assistant Examiner*—Yonas Bayou
(74) *Attorney, Agent, or Firm*—John P. O'Banion

(57) ABSTRACT

A method and apparatus for protecting privacy in power line communication (PLC) networks. Data transmitted on a PLC network is encrypted according to a network key and can be properly received only by registered devices that have the proper network ID and network key value so that proper decryption can be performed. According to the invention a streaming media device is provided with a compatible network ID and network key during a registration process facilitated by coupling the device (applicant) to a direct power line connection associated with another device (administrator). The network key, and optionally network ID, are then shared over the direct connection without being distributed over the PLC network at large. By way of example, the data is prevented from being distributed across the PLC network in response to using selectable filtering of PLC data, and preferably a secure data communication mechanism, such as public-private key encoding.

20 Claims, 5 Drawing Sheets

SYSTEM AND METHOD FOR AUTHENTICATING/REGISTERING NETWORK DEVICE IN POWER LINE COMMUNICATION (PLC)

CROSS-REFERENCE TO RELATED APPLICATIONS

This application claims priority from U.S. provisional application Ser. No. 60/603,483 filed on Aug. 20, 2004, incorporated herein by reference in its entirety, and from U.S. provisional application Ser. No. 60/637,049 filed on Dec. 16, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to power line communications, and more particularly to an apparatus and method of establishing a compatible network key for encrypting and decrypting communications between streaming media devices communicating over a PLC network.

2. Description of Related Art

The convenience of Power Line Communication (PLC) systems combined with the increased availability of off-the-shelf PLC circuitry is leading to rapid deployment in a number of consumer and business market segments. PLC is a network technology in which consumer electronics devices are networked over conventional AC power connections. Recent enhancements in the available bandwidth has widened applications for PLC into streaming media (i.e., audio and video) networking arenas.

FIG. 1 depicts a basic configuration 10 of a streaming media PLC network. A streaming media server device 12 is shown coupled to streaming media client devices 14, 16 through a PLC network 18. Server 12, such as a personal computer 20 adapted for executing a PLC network server application, provides for storing streaming media content, receiving various broadcast, cable, satellite, or media based programming, and transmitting media streams over power line 18. Clients 14, 16 may comprise any device configured for receiving or transmitting audio and/or video content through the PLC network, although they may also communicate content by other means as well, such as line-in, line-out connections, and so forth. Clients 14, 16 are depicted as video monitors or television sets 22, 24, however, it should be appreciated that clients may comprise video/audio playback or recording devices, cameras, audio recording equipment, audio systems, video monitors, television systems, control panels, monitoring devices, alarm control equipment, and so forth.

One principle advantage of PLC networking is that a separate network connection between server 12 and clients 14, 16 need not be established, because the devices are already coupled through the common AC power line from which they draw operating power. The PLC network connectivity is thus a flexible arrangement in which all devices can join the network in response to simple connection of a power plug 26 into the power outlet 28. Although a two prong power plug 26 is shown for the sake of simplicity, it should be appreciated that any desired power plug configuration can be supported, for example the use of any two, three or four conductor power connections which may be required for a given region, or type of power distribution arrangement. Despite the numerous advantages described, PLC networks suffer from security issues.

FIG. 2 depicts a common PLC network scenario 30 in which the power line 32 is shared between a first site 34 (e.g., home, office, business, industry, and so forth) and a second site 36. In this case two similar homes 34, 36 are shown each having PLC-based equipment, exemplified as servers 38, 42 and clients 40, 44. It will be appreciated that in residential settings five or more homes may share the power lines extending from a given transformer. Accordingly, the data communicated over the PLC network within one home could be captured on the PLC network within the other homes, wherein security becomes a concern.

In attempting to overcome this security issue the content being shared over the PLC network by a given entity is preferably communicated in an encrypted (scrambled) form and decrypted (de-scrambled) after receipt. Decrypting the communication requires that the device be provided with a decryption key that is utilized by the decryption routines (or circuits) for adjusting decryption operations to match the encryption which was performed. All the devices utilizing the PLC network must share the same network key in order to communicate with one another.

Although content encryption-decryption can provide security it is often troublesome to provide and share a decryption key. One method of establishing the encryption-decryption network key is for the user to manually enter a network key value for the device. However, the key can comprise a long series of digits making entry difficult, while not every client device is necessarily configured with a keypad or sufficiently adept user interface to readily allow entry of the key. In addition, manual entry of the decryption key adds another level of complexity to utilizing PLC network communication. The security key could be shared over the PLC network itself, but this could also allow external devices of other entities to capture the key thus compromising security. Utilizing manual entry security keys would undoubtedly frustrate users while subjecting manufacturers to a high volume of service calls arising from improper entry or use of the network keys. In addition, one must consider the problems which would arise when periodically updating a security key to increase privacy protection.

Accordingly, a need exists for a system and method of securing a power line communication (PLC) network while overcoming the problems with an entity sharing network keys with other streaming media devices on its portion of the PLC network. These needs and others are met within the present invention, which overcomes the deficiencies of previously developed methods of maintaining common network keys.

BRIEF SUMMARY OF THE INVENTION

The invention provides an apparatus and method for establishing secure communications over a power line communications (PLC) network between streaming media devices. Communications over the PLC network are encrypted-decrypted, or otherwise scrambled, in response to a common network key (NK) value which is shared by the devices. The present invention allows passing a common network key from one streaming media device to another without distributing that network key over the PLC network itself, or requiring manual entry of the key. It should also be appreciated that each section of a network (i.e., per entity) is preferably identified by a network identification (NID) value, which may also be communicated with the network key (NK) value.

By way of example and not limitation, a network key is shared from an administrator device to an applicant device. In one embodiment the device operating as administrator provides at least one socket (i.e., 2 or 3 wire AC socket) for connecting the power cord of another streaming media device which will operate in an applicant mode to obtain a compatible network key. Connection of the applicant to the socket in the administrator is configured according to the invention for establishing a direct and private connection between applicant and administrator. After detecting the presence of an applicant, the circuitry determines if it has a network key which is compatible with the administrator. If not, then the administrator establishes a secure connection with the applicant, such as by activating a PLC data filter, and provides a proper network key for storage and use by the applicant. It should also be appreciated that additional information can be optionally provided according to the invention along with the network key (NK) value, such as a network identification (NID) value.

An embodiment of the present invention describes an apparatus for securely communicating streaming media over a power line communications (PLC) network, comprising: (a) a first streaming media device configured for connecting to a power line for the receipt of operating power; (b) a power line communications circuit, within the first streaming media device configured for communicating data over the power line operating as a PLC network, between the first streaming media device and at least a second streaming media device coupled to the power line; (c) a scrambling circuit within the communications circuit which encrypts or decrypts data (scrambles or unscrambles) in response to a network key value; and (d) means for securely sharing and storing a common (or at least compatible) network key value between streaming media devices, in response to establishing a physical connection between the first streaming media device and the second streaming media device, without communicating the network key value over the PLC network. It should be realized that the terms "first" and "second" media streaming device are assigned arbitrarily in the above description for the sake of simplicity, while the practice of the invention is not limited to two devices, nor to a specific first-to-second relationship.

The first and second streaming media devices are selected from the group of streaming media devices consisting essentially of source devices, players, recorders, cameras, and servers, which are configured for use with video streams, audio streams or a combination of audio and video streams. The first streaming media device operates in either an administrator mode in which it supplies a network key (NK) value to the second streaming media device, or in an applicant mode in which it receives and stores the network key value from a second streaming media device for use during encryption or decryption of streaming media communicated over the PLC network. The administrator may utilize any compatible selected or predetermined value for being shared as a network key value.

One preferred mechanism is that the administrator retrieves a default network key value for sharing as the network key unless directed (i.e., according to user or system commands) to share a different value. The invention can further comprise means for detecting that the first streaming media device and the second media device do not share a common network key value (e.g., comparison circuit detecting validity and compatibility of the network key value). According to one variant the means for securely sharing a network key within the apparatus is also configured for sharing additional information between the streaming media devices, preferably at least a network identification value.

The means for securely sharing the network key in the apparatus above can comprise (a) a key-sharing circuit configured for establishing a direct (i.e., private) power line connection; (b) a memory for storing a network key value shared over the direct power line connection; (c) a selective PLC data filter configured for filtering out PLC data so that it is not communicated beyond the direct power line connection and distributed over the PLC network. The network key above is thus shared over the direct power line connection without being distributed over the PLC network, while the direct power line connection can be disconnected after the network key has been shared. According to one embodiment, the selective PLC data filter comprises a low pass filter which can be switched in or out of the path between the direct power line connection and the connection to the PLC network.

The direct power line connection may comprise (1) a power receptacle on either the first streaming media device to which at least one of the second streaming media devices are coupled; or (2) a power receptacle on one of the second streaming media devices to which the first streaming media device is coupled. The power receptacle is preferably coupled, such as through a selective PLC data filtering device, to a power plug connection configured for receiving operating power from the power line.

The apparatus can include means for indicating that sharing of the network key value has been completed between the streaming media devices. For example an optical indicator may be utilized, or any alternative annunciation mechanism relied upon, such as audio annunciation, annunciation on existing user displays, and so forth.

An embodiment of the invention may also be described as an apparatus for communicating securely over a power line communications (PLC) network, comprising: (a) a first streaming media device configured for communicating data over a power line communications (PLC) network with at least a second streaming media device; (b) a microprocessor and memory on the first streaming media device; (c) programming executable on the microprocessor for, (c)(i) determining when the first streaming media device and the second streaming media device are coupled to one another through a separate power socket within the first streaming media device or the second streaming media device, (c)(ii) activating a PLC data filter associated with the separate power socket during a registration process to prevent data communicated over the separate power socket from being distributed beyond the separate power socket connection over the PLC network, (c)(iii) communicating and storing a network key for controlling the encryption and decryption of data over the PLC network so that the first streaming media device and the second streaming media device are configured with a compatible network key, (c)(iv) deactivating the PLC data filter after the network key has been received and the registration process concluded, (c)(v) replacing the separate power socket coupling, at any desired subsequent time, with a PLC network connection.

The invention also describes a method of securely sharing a network key utilized in the encryption and decryption of streaming media communicated between streaming media devices on a power line communications (PLC) network, comprising: (a) establishing a direct power connection between a first streaming media device and a second streaming media device; (b) detecting that the second streaming media device is coupled to the direct power connection; (c) determining that the second streaming media device is not already using a network key which is compatible with the first streaming media device; (d) blocking PLC data from being communicated beyond the direct power line connection to the PLC network; (e) passing a network key from the first streaming media device to the second streaming media device to update the previous values for use by the second streaming media device in communicating over the PLC network; and (f) wherein the direct power line connection can be severed and the second streaming media device connected within the PLC network to which the first streaming media device is connected.

Embodiments of the present invention provide a number of beneficial aspects which can be implemented either separately or in any desired combination. The inventive aspects include, but are not necessarily limited to, the following.

An aspect of the invention provides methods and apparatus for establishing a common network key between streaming media devices subject to connection on a power line communications (PLC) network.

Another aspect of the invention is to share a network key between devices without making the network key accessible to other devices coupled to the PLC network.

Another aspect of the invention is to provide for establishing a common network key without the need of manually entering a key value into respective streaming media devices configured for communicating over the PLC network.

Another aspect of the invention is to provide a direct wired connection between a first and second streaming media device over which a network key, and optionally other information (e.g., network identifier) may be shared.

Another aspect of the invention is the sharing of a network key, and optionally additional information, through a power socket which establishes a direct connection with a device to which the network key is to be shared.

Another aspect of the invention provides for the use of a PLC data filter for preventing a network key being shared from being unsecurely distributed over an associated PLC network.

Another aspect of the invention is to provide for detecting if a directly coupled streaming media device already utilizes a compatible network key.

A still further aspect of the invention is that of providing security to portions of a PLC network, such that an entity can utilize their portion of the network without subjecting their streaming data to being intercepted by other entities.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
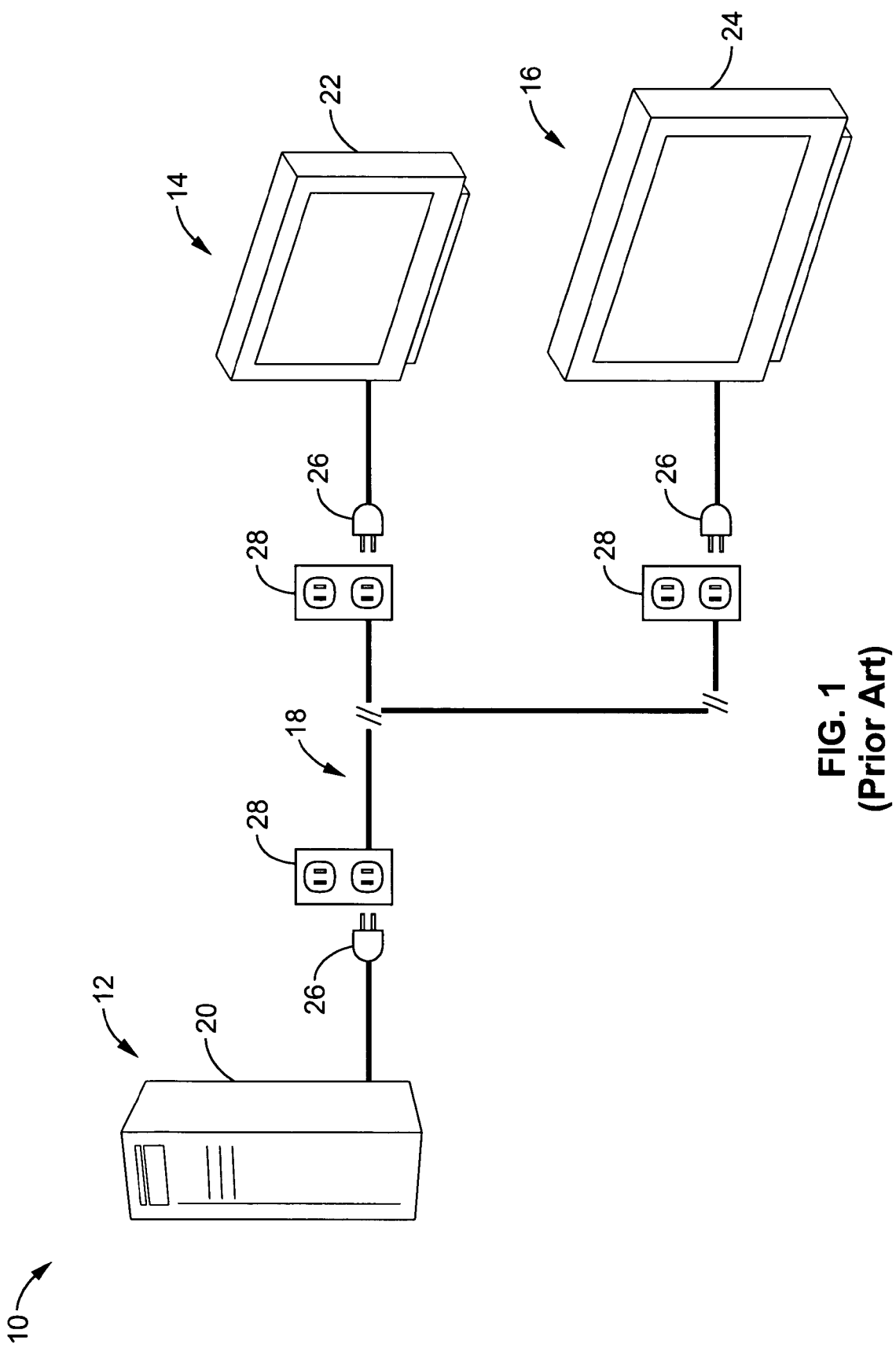
FIG. 1 is a block diagram of a conventional power line communications (PLC) network, showing client video devices coupled to a server.
Figure 2:
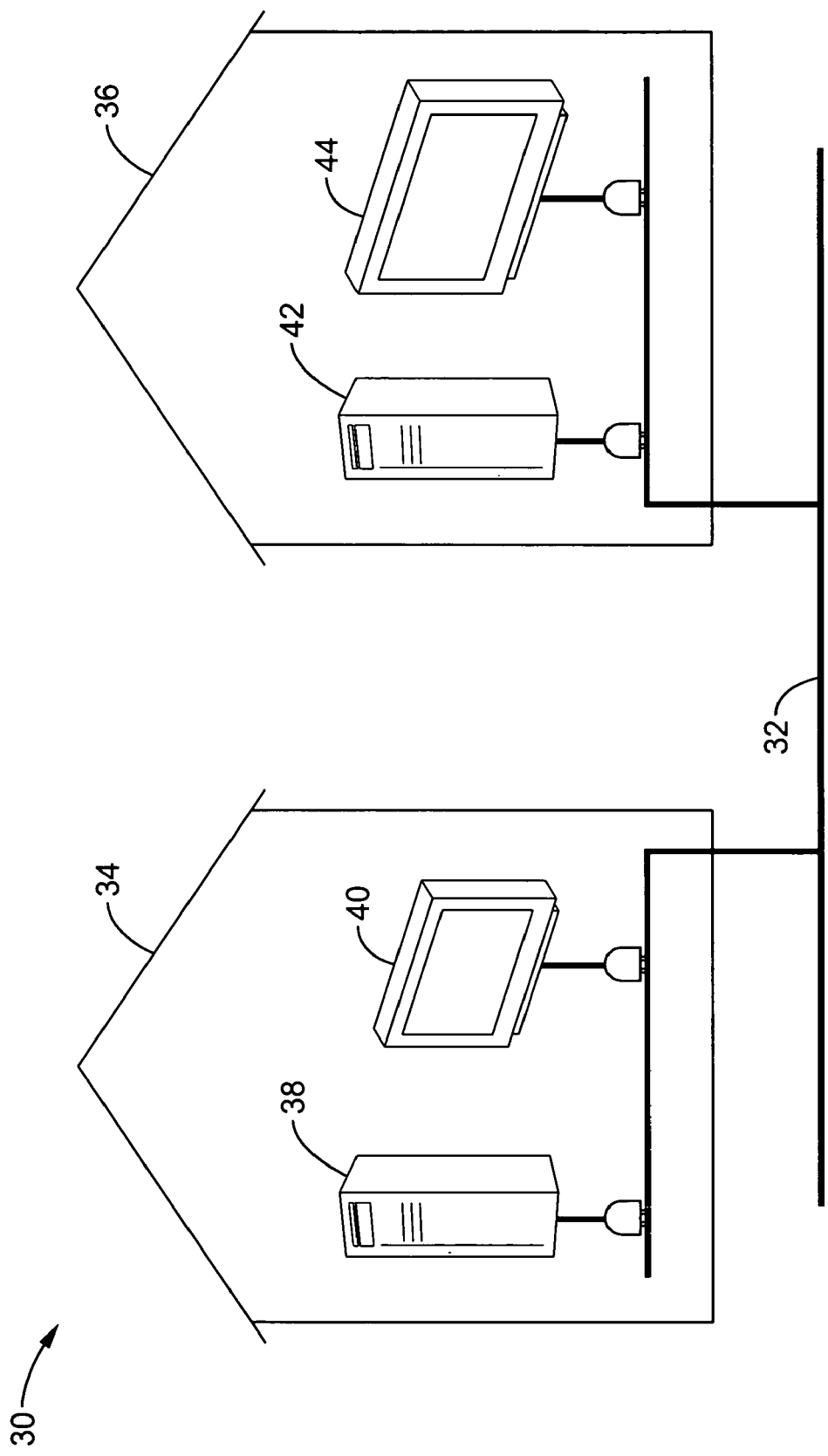
FIG. 2 is a block diagram of two stream media entities utilizing power line communications to conventionally share data over the power line communications (PLC) network.

Referring more specifically to the drawings, for illustrative purposes the present invention is embodied in the apparatus generally shown in FIG. 3 through FIG. 6. It will be appreciated that the apparatus may vary as to configuration and as to details of the parts, and that the method may vary as to the specific steps and sequence, without departing from the basic concepts as disclosed herein.

The present invention provides mechanisms for sharing a network key between PLC devices, in particular streaming media devices, without the need for manually entering a network key on the various devices. All devices configured for communicating with one another over the power line communication network, such as those devices belonging to a specific entity (e.g., household, company, and so forth), must share a common, or at least a compatible, network identification (NID) and network key (NK). It will be readily appreciated that sharing the network key over the power line communication network itself is problematic in that devices other than the intended device, such as devices of another entity, can also receive the network key. Therefore, the sharing mechanisms of the present invention do not communicate the network key to the PLC network itself during the process of sharing the network key with selected streaming media devices (applicants).

The present invention is particularly well suited for use with forms of streaming media devices including source devices, players, recorders, cameras, and servers. These streaming media devices can be configured for streaming video, audio or a combination of audio and video. The video and audio streams may be formatted according to any standard which is compatible with communication over the PLC network. Typically, these devices comprise servers (e.g., recorders with fixed or removable media, personal computers, and the like), audio/video equipment (e.g., DVD devices, cameras, video monitors, televisions, audio systems, and so forth), and so forth.

The network key is shared over a wired connection within the present invention, preferably the power line communications PLC network. In one preferred embodiment of the invention, the network key is shared through a wired connection established between a power receptacle on a first electronic streaming media device and the power plug extending from a second electronic streaming media device to supply power thereof. The device sharing the network key is typically an administrator, while the device receiving a network key is referred to herein as an applicant. It will be appreciated that the roles of administrator and applicant can comprise modes of a single device, or separate devices supporting one or both modes.

The network key is preferably shared in response to insertion of the power plug into the receptacle wherein the network key is transferred from the first device and stored within the second device for use. The transfer of the network key preferably takes place during a registration process in which additional data can be shared, such as network identification, device data and so forth. The connection of the power plug of the second device is maintained for at least a minimum "registration period" to accomplish the transfer, after which this direct connection can be disconnected and the registered device connected anywhere on the same PLC network to which the streaming media device, that shared the network key, is operably coupled.

The transfer of the network key may be performed automatically after insertion of the power cord, upon engaging power on the first and/or second device, or in response to user inputs on either the first and/or second device. The network key is preferably shared through a key-sharing circuit which provides for a secure communication of the network key, and optionally the network identification which may be combined with additional information. It should also be appreciated that the network key being shared need not be identical to that in the administrator if it is sufficiently compatible to provide for the encryption and decryption of communications between registered devices over the PLC network.

A device which is configured for communicating over the PLC network can be designed or adapted for communicating securely over the PLC network according to the present invention by incorporating the following elements. (1) A means for encrypting and decrypting data in response to a network key securely communicated between the electronic device and other electronic devices. The encryption and decrypting means may comprise an encoder or other forms of scrambling circuit, software-driven encoding-decoding, or similar. (2) A means for sharing a network encryption/decryption key in response to establishing a private network connection between the electronic device and at least one other electronic device which is configured for PLC communication. The private network connection can be established in response to the use of a power connection between an administrator and applicant device, which prevents sharing of the information with devices coupled over the PLC network.

Figure 3:
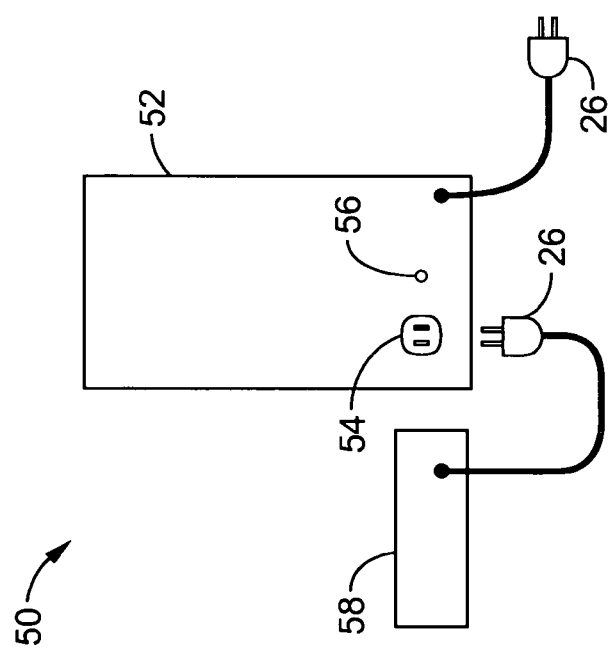
FIG. 3 is a rear view of an electronic device adapted according to an embodiment of the present invention for sharing a network key with other power lines devices, showing utilization of a power receptacle through which the network key is shared.

FIG. 3 illustrates network key sharing 50 by way of example between a first device 52 and a second device 58. A first PLC device is configured with both a power connection 26 and a receptacle (socket) 54 for sharing power with additional devices. A means of providing user input and/or output (I/O) 56 is provided in association with the key sharing mechanism. By way of example and not limitation the annunciator I/O is represented as an indicator light 56, although any combination of output device and/or input selectors can be utilized without departing from the teachings of the present invention.

A second PLC device 58 is shown being coupled to said first PLC device 52 through a power cord 26. It will be appreciated that data communicated between receptacle (socket) 54 of first device 52 and power cord 26 of second device 58 will not be shared over the PLC network, insofar as device 52 is configured to properly filter the data from reaching its plug 26. In this way the data communicated between the streaming media devices 52, 58 is not made available on the PLC network for receipt by other entities. It should also be appreciated that the above limits on data distribution apply only temporarily during the key sharing process itself. First device 52 is referred to herein as an administrator, in view of its ability to distribute the network key to the second device 58, or other devices as may be intermittently coupled through receptacle 54.

A network key is established within the first device to provide a unique network encryption/decryption key upon which PLC communication by an entity associated with first device 52 may be established. The network key is retained within first device 52, such as within non-volatile memory (e.g., FLASH, ROM, EEPROM, logic circuits, fusible traces) or other means of retaining a network key value. In one embodiment a microprocessor is configured for executing programming to control the network key sharing process, and optionally the encryption/decryption process. The network key and other data may be stored in data memory (e.g., RAM, registers, and the like) while the programming may be stored in non-volatile memory (e.g., ROM, FLASH, and so forth) or volatile memory loaded from a media containing the code. It should be appreciated that the network key can comprise a fixed value encoded within the hardware of device 52, although it is more preferably selectable within device 52 to allow for changing of the network key. First device 52 may also be configured for receiving the network key from another device, such as another administrator, thus allowing multiple administrators to be coupled within a PLC network. In addition the network key can be copied from a default network key installed as a default value. Still further, the sharing aspects of the present invention can be utilized in combination with other mechanisms for securely communicating data.

In addition to the network key, other information may be passed between the first and second devices in response to establishing a connection, for example information about the priority level of the administrator, how the network key is to be used, how the network key is to be changed (i.e., describing a rolling code change implementation), and so forth.

When a new device is to be introduced for use over the PLC network of an entity, it is first coupled to a key-sharing circuit associated with an administrator. In the above example the power connection from the second device is plugged into a power receptacle provided on a device operating as an administrator. The administrator recognizes that a connection has been established with a PLC-enabled device and commences an authentication and registration process of the new device for the PLC network. In one embodiment of the invention, the connection of a PLC-enabled device on the direct connection, such as the described power connection, can be recognized in response to detecting that power is being supplied through the direct connection or that PLC data is being received over the direct connection, or a combination thereof. During the registration process the network key is delivered to the new device. A signal is preferably output to indicate the completion of the registration process, such as an audio output, or indicator (i.e., indicator 56 in FIG. 3). The generation of the signal indicates that the registration process has completed successfully and that the new device may be disconnected and connected in the PLC network wherein it is prepared for securely communicating with the administration device and other device which have already received a network key.

Figure 4:
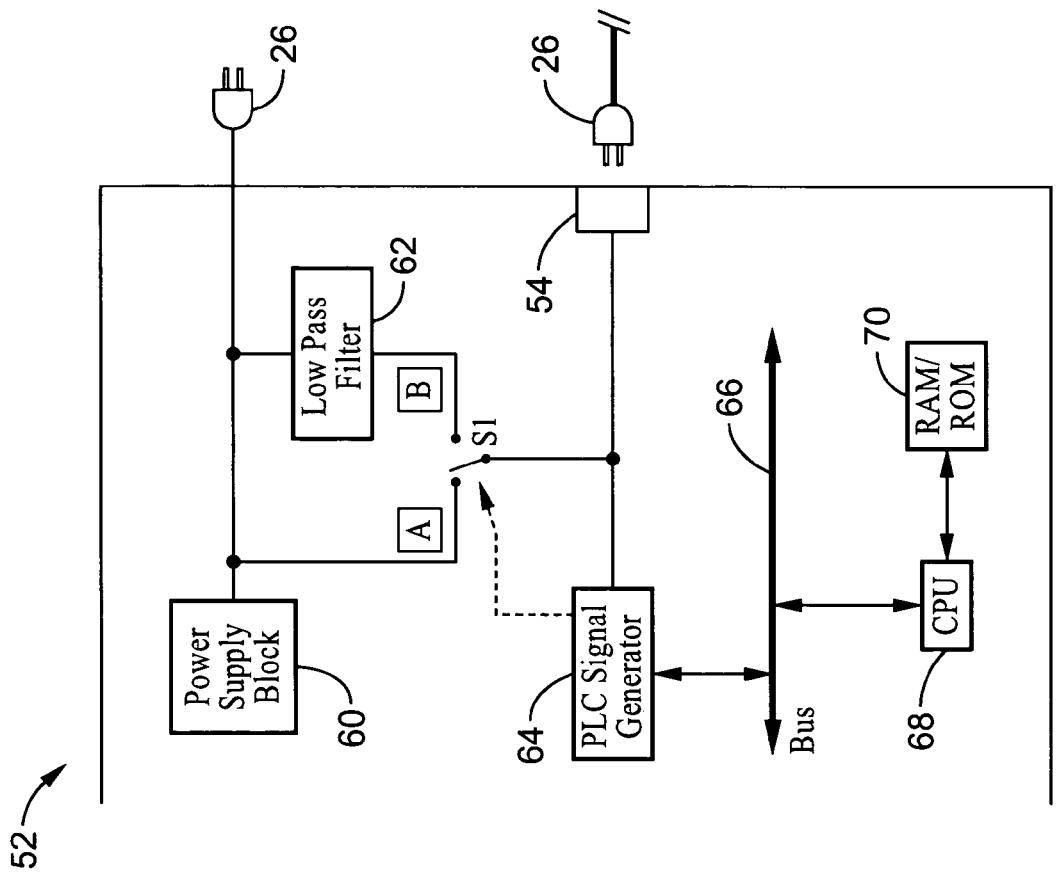
FIG. 4 is a schematic of a key-sharing circuit adapted according to an embodiment of the present invention, showing sharing of the network key with other devices whose power cord is coupled to a receptacle connected to said key-sharing circuit.

FIG. 4 is a simplified schematic of a circuit for communicating a network key with a device connected through a power receptacle, such as depicted in FIG. 3. Administrator 52 is shown having a power connection 26 from which power is drawn by a power supply block 60. A low-pass filter 62 is shown configured for selective engagement, by switch S1, on the power connection. It will be recognized that a low-pass filter allows passing power while filtering out, blocking, data signals utilized for communicating over the PLC network. Switch S1 provides a mechanism for activating the PLC data filter in the key-sharing circuit, and can also provide for deactivating the PLC data filter after the network key sharing is completed or a registration process is completed in which the network key is shared.

The state of switch S1 is preferably determined by a control circuit, such as a PLC signal generating circuit 64 or a CPU 68 (e.g., microcontroller, microprocessor, or similar processing device) coupled to memory 70 over bus 66. In a first position (A) switch S1 allows administrator 52 to detect if the newly connected device (applicant) has a different network ID (NID) than its own. Upon detecting a different network ID (NID) value switch S1 is moved to alternate position (B) in which the administrator, via PLC signal generator 64, sends a notification to the applicant through socket 54. It will be appreciated that the notification is not sent out over the entire PLC network, wherein the network key is securely retained. In delivering the network key a registration process is performed between the administrator and the applicant, in which various information can be securely exchanged including both a network ID value and network key.

Upon completing the registration process switch S1 is restored to a first position (A) in which the PLC data is no longer being filtered between that received over the PLC and that communicated with the applicant. The proper completion of the registration process is preferably signaled in some convenient manner, such as audio alert, indicator lamp, and so forth.

Figure 5:
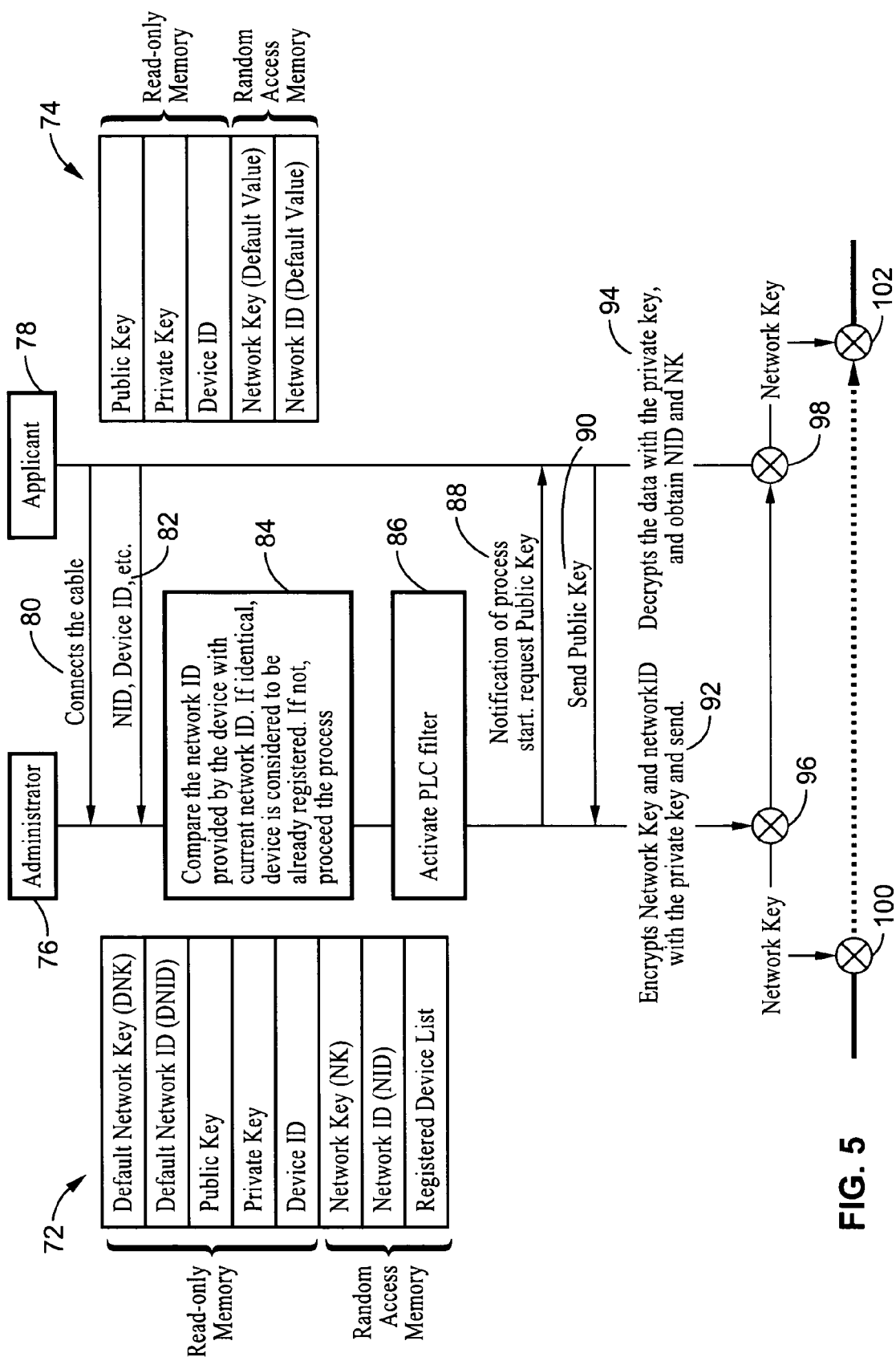
FIG. 5 is a data schema and partial flow diagram of key sharing according to an embodiment of the present invention, showing key sharing data and the registration process.

FIG. 5 illustrates an example of the registration process between the administrator and applicant, such as depicted by FIG. 3 and FIG. 4. A PLC device is configured with a set of public and private keys held in memory (i.e., preferably non-volatile or read-only memory). The PLC devices are also preferably configured with memory for retaining a network ID (NID) and a network key (NK), while administrators preferably retain a value for default network ID (DNID) and default network key (DNK) which should be unique for each administrator, while the DNID preferably has a one-to-one correspondence to the DNK. It should be appreciated that all streaming media devices of a given entity operating on a particular PLC network should be registered by a single administrator device, or over multiple administrator devices which themselves have been registered with one another so that they share an identical, or at least compatible, network key value. In this way all the device on the network will utilize compatible encryption and decryption and thus be able to properly communicate with one another.

In one embodiment of the invention the NID and NK values are set to invalid values for non-administrator devices, thereby requiring a registration process prior to use. In a preferred embodiment of the invention the user is alerted, by audio or visual cues, upon attempting to communicate over the PLC network with a device which has not been registered on the specific network. In one embodiment of the invention the administrator utilizes the DNIC and DNK values as initial values of the NIC and NK respectively.

Upon connecting a new device, referred to as an applicant, to an administrator a message is sent from the applicant including its NID. The administrator compares the NID with its own value for NID. If the values are identical then the applicant has already been registered. In one embodiment which provides for changing of the network key (NK) value, if the NID matches then the NK value is compared with the administrator to determine if the NK value of the administrator has changed and needs to be updated on the applicant device.

If the applicant needs to be registered or updated, a notification is sent back to the applicant. In response to the notification a secure communication is preferably performed between the administrator and applicant. For example, the applicant sends its public key to the administrator. It is assumed that the applicant is connected through the socket and is eligible for registration. The administrator encrypts the NK and NID with the public key and sends them to the applicant who has the corresponding private key. The shared NK is subsequently utilized during encryption/decryption of communications by the applicant on the PLC network. Data transmitted from devices can only be recognized if sent with the proper encryption as determined by the NK, and only devices that perform decryption as determined by the NK will properly reconstitute the content into an unscrambled form. Based on the standard public key method, the encrypted data can be decrypted only by the applicant who has the corresponding private key. Transmitting devices, such as content sources, are configured to encrypt the data using the NK prior to transmission over the PLC network, while receiving devices, such as output devices or recorders, are configured to use the NK for decrypting the content.

It will be appreciated that the control algorithms according to the present invention can be configured to require a separate NK for encryption and decryption, thus controlling whether devices are allowed to transmit and/or receive within the PLC network.

Referring to FIG. 5 a data structure 72 is shown for an administrator device which comprises fields Default Network Key (DNK), Default Network ID (DNID), Public Key, Private Key, Device ID, Network Key (NK), Network ID (NID), and a registered device list. It will be appreciated that each administration device on the PLC network preferably includes a list of registered devices, so that it can properly control aspects of the communication with the devices. A similar data structure 74 is shown for an applicant device, preferably containing a subset of the administrator data, specifically: Public Key, Private Key, Device ID, Network Key (NK), and Network ID. It should be appreciated that the above fields are provided by way of example only, and that these fields may be eliminated or altered, while additional fields can be incorporated without departing from the teachings of the present invention.

The interaction between an administrator 76 and applicant 78 is shown by illustrative activity and message passing. A communication process is depicted as solid lines up to transition point 100, and after transition point 102, wherein data communicated between administrator 76 and applicant 78 is distributed across the entire PLC network. The dashed lines depicted between transition 100 and transition 102 indicate communication in which communications with the applicant are not shared over the entire PLC network. Aspects of these "private" communications according to the invention are depicted in the communication sequences shown between administrator 76 and applicant 78. The registration sequence is generally considered complete according to this embodiment when the NK is delivered from administrator 96 to applicant 98, wherein the PLC filtering can be deactivated which supports the "private" connection of applicant 78 to administrator 76.

Applicant 78 is physically connected 80 to the administrator, however, it is connected over a private connection and not over the PLC network which is subject to interception. For example, the power plug from the applicant can be plugged into a power receptacle on the administrator 76, such as shown in FIG. 4. The NK communication process generally proceeds according to the following process.

An NID and device ID values are communicated 82 to administrator 76. The administrator compares the NID and optionally the NK to determine if any registration must be performed as per block 84. If registration is needed, then the PLC data filter is activated at block 86 to allow the administrator and applicant to communicate over their direct link while preventing the secure data from going out over the PLC network at large.

A notification process is commenced by the administrator at block 88, with a public key being sent in response by the applicant at block 90. The administrator then encrypts the NID and NK with the private key and sends it out in communication 92 and the applicant decrypts the data with the private key and obtains the NID and NK as per communication 94. It will be seen that the administrator and applicant communicate over their separate secure connection, instead of over the PLC network at large, for a period indicated by the dashed lines between communication summation symbols 100 and 102. After the registration process is complete then both devices begin communicating PLC data over both their private connection and the PLC network at large.

It should also be appreciated that the NID and NK can be less preferably communicated directly, without any private-public key encryption, during the registration process between the applicant and administrator because the connection between them is secure and the data is being filtered during the registration process and is thus not transmitted over the PLC network at large.

In one embodiment of the invention the controller of an applicant (or administrator) is configured to allow the user to reset the NID and/or NK back to a default value, or optionally to some desired value. For example a reset button can be utilized for this purpose, or a command applied through a user interface, and so forth. In addition, embodiments of the invention can be configured to allow the user to establish a desired value for the NID and NK, or to establish a desired DNID or DNK to which new applicant devices will be configured. In another example a DIP-switch, or software selector, may be provided allowing the user to select registration or unregistration modes. When a device is connected in unregistration mode, the administrator sends an invalid value for NID and/or NK by which the applicant devices become reset back to unusable values, wherein their need of registration data is readily apparent.

The portion of a PLC network controlled by a given entity should have at least one administrator for distributing the proper NID and NK values to the applicant devices. However, it should be appreciated that once device are registered they can communicate over the PLC network without the need of an administrator. Typically the administrator function would be associated with the more complex device on the network, such as within servers or other content sources or tuners (e.g., computer servers, media players, satellite/cable tuner-descrambler boxes), and so forth. It should also be recognized that there is no upper limit on the number of administrators which can be utilized within a given PLC network.

Figure 6:
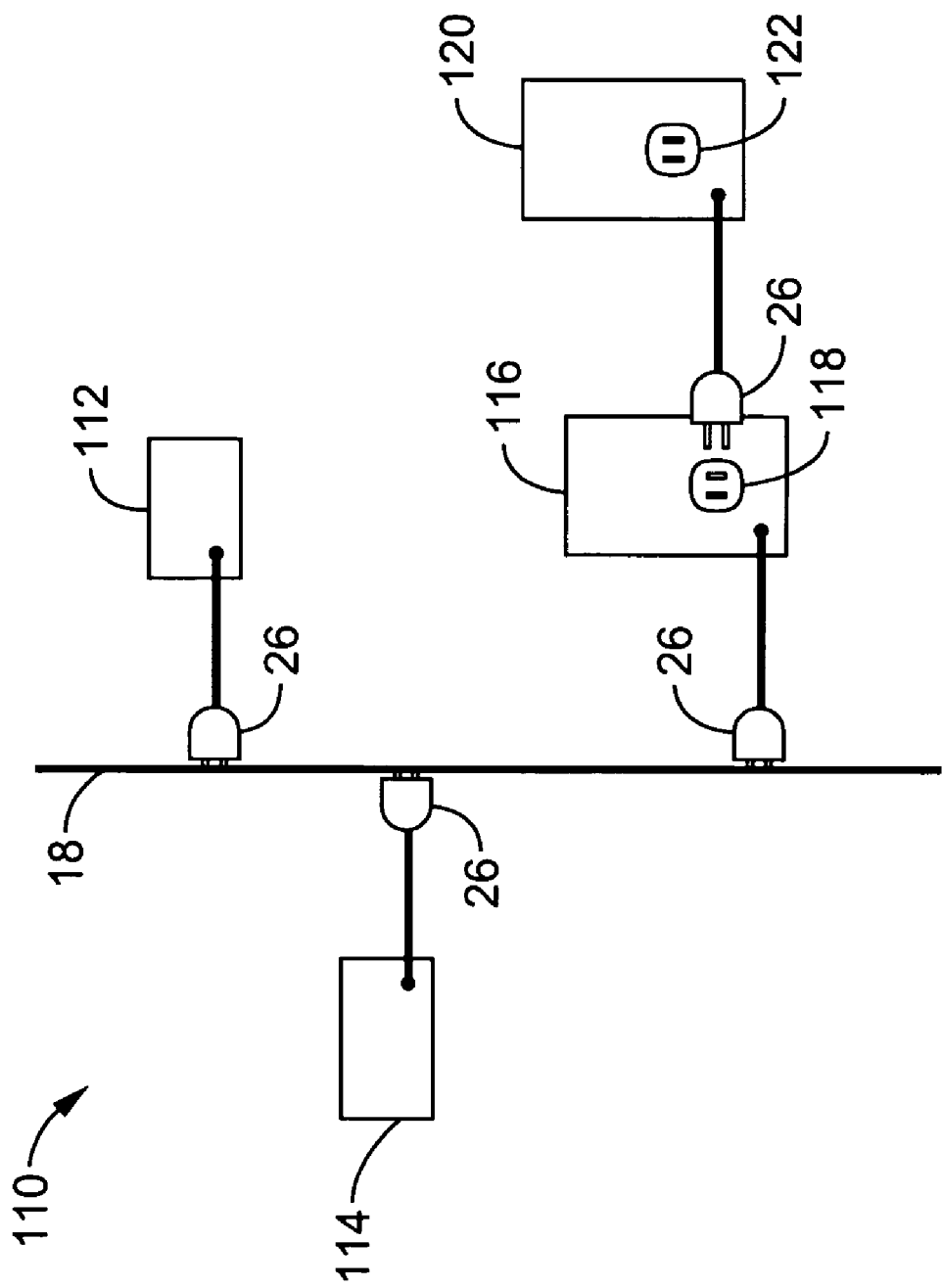
FIG. 6 is a block diagram of multiple administrator connectivity according to an embodiment of the present invention, showing multiple ganged administrators.

FIG. 6 illustrates an example 110 of multiple administrators. PLC devices 112, 114, and 116 are coupled to power line 18. Device 116 is an administrator device having a socket 118. Additional administrators, such as device 120, can be registered by coupling their input connection into socket 118. It will be appreciated that connecting plug 26 of master administrator 116 to socket 122 of administrator 120 would reset the NID and NK of the master administrator to those provided by the new administrator (i.e., according to the defaults or otherwise determined), which would then change the encryption/decryption of master administrator 116, wherein it could no longer communicate with the devices which had been registered by the master administrator 116. To avoid this situation the master administrator is preferably configured to update the NID and NK of terminals 112, 114. To accomplish this, master 116 can rely on a list of terminals which have been registered to itself (see "registered device list" within memory 72 of administrator in FIG. 5). The master administrator sends a notification to each of the listed terminals indicating that the NID and NK has been updated and requests their public key. The master administrator then encrypts new NID and NK with the public key and sends this to each terminal which decrypts them by its own private key. In this way new NID and NK are delivered securely only to those listed terminals.

The embodiments described above provide a number of advantages, however, it should be appreciated by one of ordinary skill in the art that the invention may be implemented in a number of alternative ways without departing from the teachings of the present invention. By way of example and not of limitation, a removable network key sharing circuit can be configured for receiving a network ID and network key while connected to an administrator (or any other device serving as a source of an NID and NK). After which the module is connected to an applicant which loads the new NID and NK from the module. In one embodiment, the module can comprise a device which plugs between an AC plug and a receptacle on the PLC network. The device can contain similar filtering mechanisms described above, in addition to memory for containing the NID and NK. The removable device allows for the secure transfer of NID and NK values to remote devices without the need of establishing a direct physical power connection between administrator and applicant. The above is provided by way of example, which although they may be less preferably, are still within the scope of the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for securely communicating streaming media over a power line communications (PLC) network, comprising:
   a first streaming media device configured for connecting to a power line for the receipt of operating power;
   a power line communications circuit, within said first streaming media device, configured for communicating data over said power line operating as a PLC network, between said first streaming media device and at least a second streaming media device coupled to said power line;
   a scrambling circuit within said communications circuit which encrypts or decrypts data in response to a network key value; and
   means for securely sharing and storing a common network key value between streaming media devices, in response to establishing a private physical connection between said first streaming media device and said second streaming media device, through which said common network key is shared between said first and second media device without communicating the network key value over the physical PLC network;
   wherein said private physical connection is maintained for a sufficient period to share the network key, whereafter private physical connection can be disconnected and the first and second media devices coupled anywhere over the power line communications (PLC) network for securely communicating streaming media over the power line communications (PLC) network using said common network key.

2. An apparatus as recited in claim 1, wherein said first and second streaming media devices are selected from the group of streaming media devices consisting essentially of source devices, players, recorders, cameras, and servers, which are configured for use with video streams, audio streams or a combination of audio and video streams.

3. An apparatus as recited in claim 1, wherein said first streaming media device operates in either an administrator mode in which it supplies said network key (NK) value to said second streaming media device, or in an applicant mode in which it receives and stores said network key value from a second streaming media device for use during encryption or decryption of streaming media communicated over said PLC network.

4. An apparatus as recited in claim 3, wherein said first streaming media device operating in administrator mode retrieves a default value for said network key and supplies this value to said second streaming media device.

5. An apparatus as recited in claim 1, further comprising means for detecting that said first streaming media device and said second media device do not share a common network key value in preparation for sharing and storing said network key value.

6. An apparatus as recited in claim 5, wherein said detecting means comprises a comparison circuit for determining if a received network key value is valid and matches a network key value stored in memory.

7. An apparatus as recited in claim 1, wherein said means for securely sharing a network key is also configured for sharing a network identification between said streaming media devices.

8. An apparatus as recited in claim 1, wherein said means for securely sharing a network key comprises:
   a key-sharing circuit configured for establishing a direct power line connection;
   a memory for storing a network key value shared over said direct power line connection;
   a selective PLC data filter configured for filtering out PLC data so that it is not communicated beyond said direct power line connection over the PLC network;
   wherein the network key is shared over the direct power line connection without being distributed over the PLC network; and
   wherein the direct power line connection can be disconnected after the network key has been shared.

9. An apparatus as recited in claim 8, wherein said selective PLC data filter comprises a low pass filter which can switched in or out of the path between the direct power line connection and the connection to the PLC network.

10. An apparatus as recited in claim 8, wherein said direct power line connection comprises:
    a power receptacle on either said first streaming media device to which at least one of said second streaming media devices are coupled, or on one of said second streaming media devices to which said first streaming media device is coupled;
    wherein said power receptacle is coupled to a power plug connection configured for receiving operating power from said power line; and
    wherein said selective power line communication (PLC) filtering can be selectively coupled between said receptacle and said power plug connection.

11. An apparatus as recited in claim 1, further comprising means for indicating that the network key value has been shared between said first streaming media device and said second streaming media device.

12. An apparatus as recited in claim 11, wherein said means for indicating comprises an optical indicator.

13. An apparatus for communicating securely over a power line communications (PLC) network, comprising:
    a first streaming media device configured for communicating data over a power line communications (PLC) network with at least a second streaming media device;
    a separate power socket within said first streaming media device or the second streaming media device configured for establishing private power line communications (PLC) between said first streaming media device and at least the second streaming media device, and without communicating data over the entire physical PLC network;
    a microprocessor and memory on said first streaming media device;
    programming executable on said microprocessor for,
       determining when said first streaming media device and the second streaming media device are coupled to one another through said separate power socket,
       activating a PLC data filter associated with said separate power socket during a registration process to prevent data communicated over said separate power socket from being distributed beyond the separate power socket connection over the PLC network,
       communicating and storing a network key for controlling encryption and decryption of data over the PLC network so that said first streaming media device and the second streaming media device are configured with a compatible network key, deactivating said PLC data filter after the network key has been received, replacing said separate power socket coupling, at any desired subsequent time after completion of said registration process with a PLC network connection, through which the media devices can securely communicate using said network key.

14. A method of securely sharing a network key utilized in the encryption and decryption of streaming media communicated between streaming media devices on a power line communications (PLC) network, comprising:

establishing a private and direct power connection between a first streaming media device and a second streaming media device;

detecting that second streaming media device is coupled to said direct power connection;

determining that the second streaming media device is not already using a network key which is compatible with the first streaming media device;

blocking PLC data from being communicated beyond said direct power line connection to the PLC network;

passing a network key from the first streaming media device to the second streaming media device over the private and direct power connection to update the previous values for use by the second streaming media device in communicating over the PLC network; and wherein the direct power line connection can be severed and the second streaming media device connected within the PLC network to which the first streaming media device is connected.

15. A method as recited in claim 14, wherein said first streaming media device is configured with a default network key value for use when a network key has not been previously shared with said first streaming device.

16. A method as recited in claim 14, wherein said direct power connection comprises a power receptacle on said first streaming media device to which the power cord from at least one other streaming media device may be connected.

17. A method as recited in claim 14, wherein said detecting of said second streaming media device is performed in response to detecting that power is being supplied through said direct power line connection or that PLC data is being received over said direct power line connection.

18. A method as recited in claim 14, wherein said blocking of PLC data is performed by filtering out the PLC data content.

19. A method as recited in claim 14, wherein said process of establishing a new network key is a secure process configured for utilizing a public-private key mechanism for communicating data.

20. A method as recited in claim 14, further comprising unblocking said PLC data from being communicated beyond the direct power line connection to the PLC network.

* * * * *

UNITED STATES PATENT AND TRADEMARK OFFICE
CERTIFICATE OF CORRECTION

| | |
|---|---|
| PATENT NO. | : 7,616,762 B2 |
| APPLICATION NO. | : 11/045734 |
| DATED | : November 10, 2009 |
| INVENTOR(S) | : Doumuki et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Nineteenth Day of October, 2010

David J. Kappos
*Director of the United States Patent and Trademark Office*